INVENTOR
BY F. K. BECKER
J. P. Kearns
ATTORNEY

United States Patent Office 3,443,229

Patented May 6, 1969

3,443,229
QUADRATURE-CARRIER VESTIGIAL-SIDEBAND DATA TRANSMISSION

Floyd K. Becker, Colts Neck, N.J., assignor to Bell Telephone Laboratories, Incorporated, New York, N.Y., a corporation of New York Filed Apr. 13, 1966, Ser. No. 542,339
Int. Cl. H04b *1/66, 1/68*
U.S. Cl. 325—60 8 Claims

ABSTRACT OF THE DISCLOSURE

Asynchronous binary digital data transmission with more efficient bandwidth utilization in transmission media of restricted bandwidth is accomplished by differentiating input data, forming parallel binary trains from respective positive and negative transitions therein, modulating the separate binary trains onto quadrature phases of a single carrier wave, and shaping the respective modulated waves in vestigial sideband filters so that the upper sideband of one wave and the lower sideband of the other wave are principally transmitted. Pilot tones whose sum frequency bears a simple relationship to that of the carrier wave are added at the edges of the available transmission band. Although the transmitted sidebands overlap in frequency, they are noninterfering due to their quadrature relationship. The separately demodulated wave trains are recombined into the original serial data train by modulo-two addition at the receiver.

This invention relates to the transmission of binary digital data at relatively high speeds over bandwidth limited transmission channels and specifically to the superposition of vestigial sideband signals on quadrature carrier waves for such purpose.

The drive to adapt the limited bandwidth characteristics of the standard telephone voice channel continues apace. The average-grade telephone voice channel provides a usable bandwidth extending from about 300 cycles per second to 3000 cycles per second. The frequency response within this band is unfortunately nonideal and the delay distortion characteristic is substantially parabolic. Furthermore, a given communications link between data transmitter and receptor may include various combinations of cable pairs, coaxial cables and radio paths. Therefore, it has become the practice to adopt a compromise spectral shaping of signals applied to such channels. It has been determined that a raised cosine spectrum is the most efficient in these circumstances.

In my copending application, Ser. No. 459,659 filed on Mar. 28, 1965, now U.S. Patent No. 3,401,342 issued Sept. 10, 1968, I have disclosed how raised cosine spectral shaping can be combined with vestigal sideband modulation to maximize the utilization of the limited bandwidth of private-line telephone voice channels for synchronous digital data transmission. The extremely high data rates, up to four serial bits per cycle of bandwidth, obtained according to that invention require such complexities, however, as multilevel encoding, precision automatic gain control, automatic equalization and error control. All this is in addition to vestigial sideband modulation and the insertion of band edge pilot tones.

I have since discovered that spectrum space lost to signal energy in the vestigial region can be conserved and utilized in an economical, asynchronous binary data transmission system for the public switched telephone network. The proposed system permits reliable transmission up to one bit per cycle of available bandwidth while dispensing with the auxiliary requirements mentioned above.

It is accordingly an object of this invention to effect economical, asynchronous binary digital data transmission over the public switched telephone network.

It is another object of this invention to conserve the vestige portion of the spectrum normally lost in vestigial sideband transmission systems.

It is still another object of this invention to superpose two vestigial sideband spectra in overlapping relationship on a single carrier wave with a minimum of mutual interference.

These and other objects of the invention are realized in an illustrative embodiment in which the serial data to be transmitted are differentiated and divided into two groups according to respective positive and negative transitions. Each of these groups of data transitions is separately transformed into a new serial data train having a maximum transmission rate half that of the original serial transmission rate. The resultant half-speed data trains are separately modulated onto respective quadrature phases of a carrier wave whose frequency is chosen near the center of the available telephone voice-channel bandwidth. After modulation respective upper and lower vestigial sideband portions of the two modulated signals are selected in appropriate filters and combined in overlapping relationship. Due to the quadrature relationship between the sidebands there is no mutual interference in the overlapping portions in the ideal case.

In order further to expedite recovery of a demodulating carrier at the receiver in proper phase and frequency a pair of band-edge pilot tones is added to the two vestigial sideband portions to form a twin-channel composite line signal. The pilot tones are derived from a master timer along with the modulating carrier waves and are chosen to have a sum which is exactly twice the frequency of the modulating carrier waves.

The composite line signal after traversing a telephone voice channel is subjected to an automatic gain-controlled amplifier whose gain is normalized according to amplitude variations in one of the pilot tones. The two vestigial sideband portions and the two pilot tones are separated after passage through the input amplifier by appropriate filters. Quadrature demodulating carrier waves are recovered by a summation and halving of the respective pilot tone frequencies. Separate demodulated data trains from the twin quadrature transmission channels are squared by slicing and combined in a modulo-two adder to reconstruct the original transmitted serial data train for delivery to an appropriate utilization circuit.

It is a feature of this invention that two vestigial sideband signals can be combined in overlapping, yet noninterfering, relationship because the carrier components are in quadrature phase with respect to each other.

It is another feature of this invention that a serial data train is differentially encoded into separate channels whose maximum transmission rate is only half that of the original serial train. Such differential encoding facilitates reliable asynchronous decoding with such simple apparatus as a modulo-two adder.

It is a further feature of this invention that the required transmission bandwidth is kept well within the available bandwidth of an average grade telephone voice channel. Thus, the same data transmission rate of one bit per cycle of available bandwidth is obtained as in prior art single-channel vestigial sideband systems with less susceptibility to delay and amplitude distortion in the transmission medium.

It is still another feature of this invention that the spectrum space conserved by overlapping two vestigial sideband signals may be utilized with adequate margin for reverse-channel supervisory signals below the frequency of the lower band-edge pilot tone.

A more complete understanding of this invention and the various features, objects and advantages thereof may be obtained from a consideration of the following detailed description of an illustrative embodiment shown in the attached drawings in which.

Figure 1:
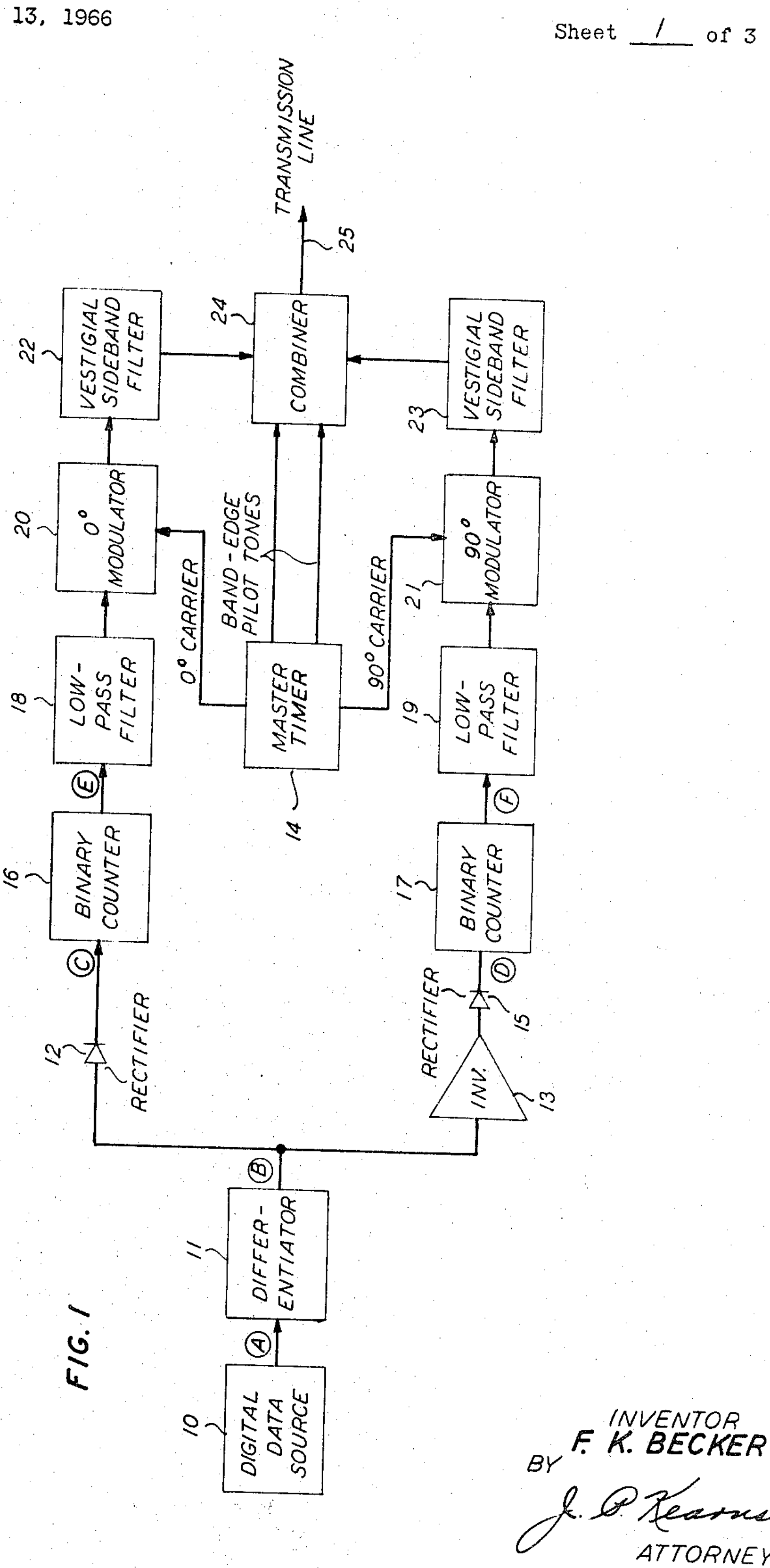
FIG. 1 is a block diagram of a transmitting terminal for a quadrature-carrier vestigial-sideband asynchronous data transmission system according to this invention.
Figure 2:
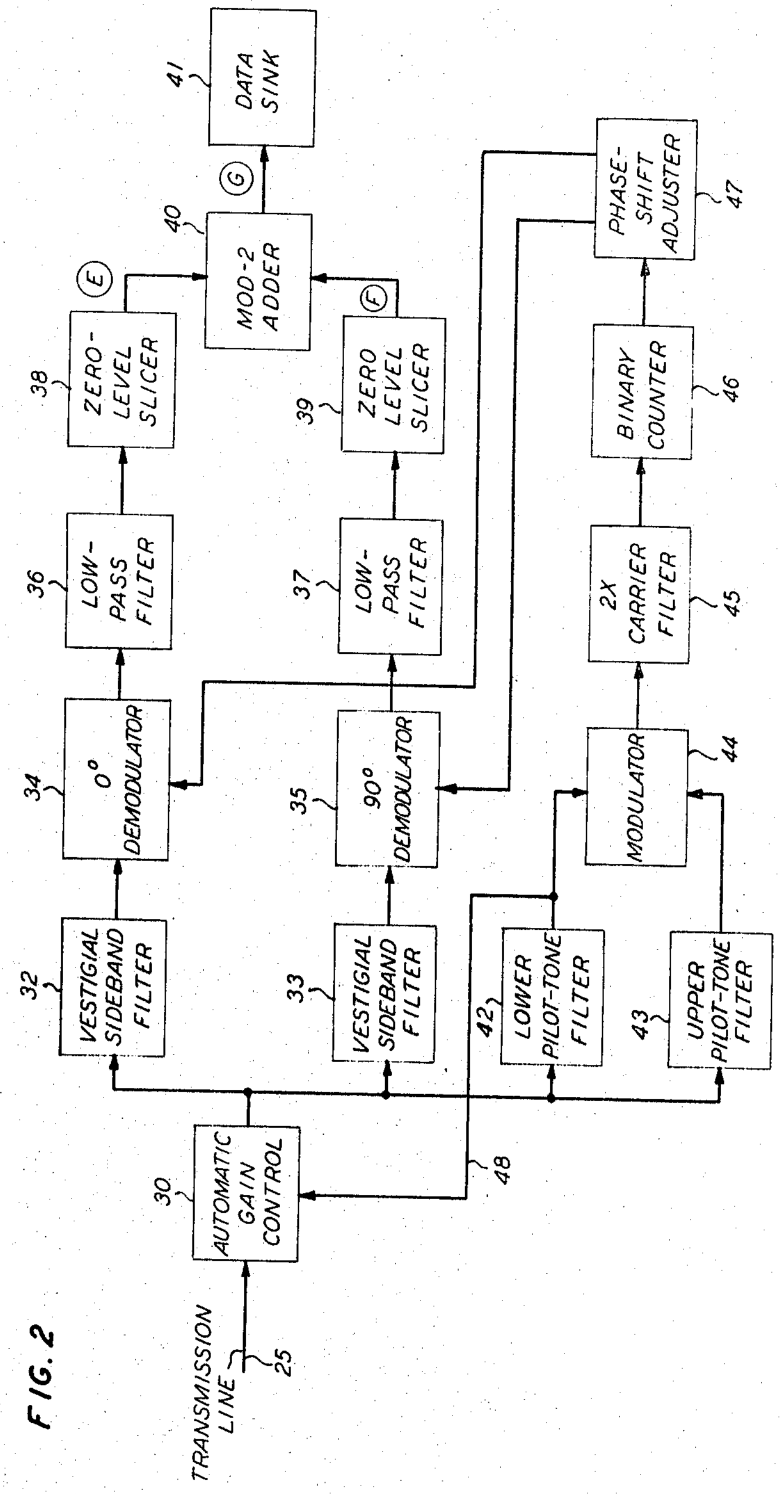
FIG. 2 is a block diagram of a receiving terminal for a quadrature-carrier vestigial-sideband asynchronous data transmission system according to this invention.

An overall data transmission system according to this invention can be realized by placing FIGS. 1 and 2 side by side with FIG. 1 on the left. The transmitting terminal of FIG. 1 would normally be located at one subscriber location and the receiving terminal of FIG. 2, at another subscriber's location. The two locations are connected through a transmission line 25, which may include any number of telephone transmission links in tandem, such as wire, cable or radio, as well as one or more telephone central offices with associated switching equipment. Calls may be set up over associated voice telephone (not shown) or automatic data control entities (not shown). Inasmuch as this invention requires only the central portion of the available voice-telephone bandwidth, reverse-channel supervisory signals may be transmitted between the two terminals in unused low-band frequency space. Such a reverse channel may be connected to transmission line 25 through appropriate hybrid connections (not shown) of well known design without interference with the data transmission band.

The purpose of the terminals shown in FIGS. 1 and 2 is to transfer serial digital data from data source 10 in FIG. 1 to data sink 41 in FIG. 2 at a minimum error rate. The intervening elements provide for converting bilevel digital data signals into voice-frequency signals adapted to the frequency response characteristics of transmission line 25 at the transmitting terminal and restoring bilevel digital data signals at the receiving terminal. The term "bilevel" is here used as synonymous with "binary" to contrast it with multilevel signals described in my prior application.

FIG. 1 shows a transmitting terminal according to this invention for converting bilevel digital data signals from an asynchronous data source 10 into twin-channel vestigial-sideband signals acceptable for transmission over line 25. The transmitting terminal of FIG. 1 comprises digital data source 10; a signal splitter and encoder further comprising differentiator 11, rectifiers 12 and 15, inverter 13, and binary counters 16 and 17; a master timer 14; low-pass filters 18 and 19; modulators 20 and 21; vestigial sideband filters 22 and 23; and combiner 24.

Figure 4:
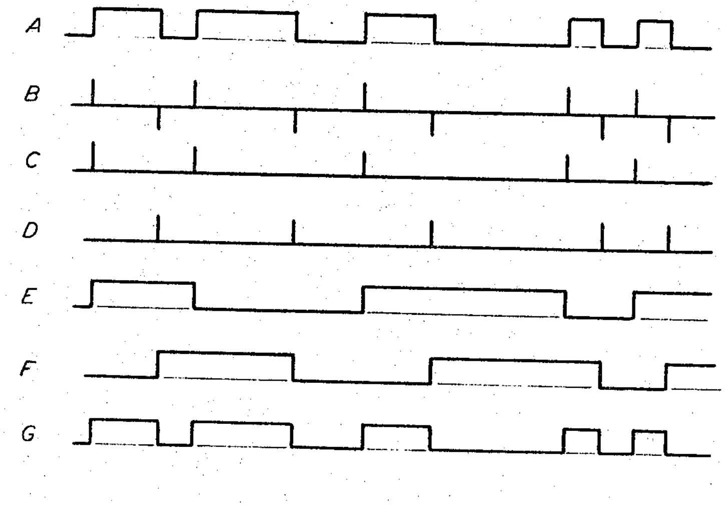
FIG. 4 is a family of timing diagrams useful in the explanation of the transmitting and receiving terminals of FIGS. 1 and 2.

Various junction points in FIG. 1 are designated by encircled capital letters for keying to the timing diagram of FIG. 4. The operation of the transmitting terminal of FIG. 1 may be conveniently described with further reference to FIG. 4.

Digital data source 10 may be any convenient customer equipment such as a computer, a punched tape reader or a facsimile machine. No clock is required in general for control of data source 10. A representative bilevel output from source 10 is depicted on line A of FIG. 4. The data signal at any given time lies on one of two direct-current voltage levels which may advantageously be plus and minus, ground and plus, or ground and minus. The upper level can represent the binary "1" and the lower level, binary "0."

Differentiator 11 responds in a conventional manner to the transitions in the data wave from source 10 by generating positive pulses for positive-going transitions and negative pulses from negative-going transitions as is indicated on line B of FIG. 4. The output of differentiator 11 is split according to the polarity of its output pulses between a 0° and 90° transmission channel. Positive transition pulses pass through rectifier 12, advantageously a semiconductor device, and drive binary counter 16. Line C of FIG. 4 shows the resultant input to counter 16. Similarly, negative transition pulses are inverted in inverter 13 and pass through rectifier 15 to drive binary counter 17. Line D of FIG. 4 shows the resultant input to counter 17.

Counters 16 and 17 are conventional complementing flip-flops, which may advantageously be transistorized for compactness and economy. Each positive input causes a change of output state in a well known manner. Lines E and F show the outputs from respective counters 16 and 17 to be separate bilevel data trains. Since binary counters are fundamentally frequency halvers, it is apparent that the maximum frequency in their outputs is only half that at their inputs as can be seen from a comparison of lines A, E and F of the timing diagram of FIG. 4. As applied to a voice-frequency channel, a maximum data rate of 2400 bits per second is contemplated. The highest frequency in the divided channels therefore only slightly exceeds 600 cycles per second.

The outputs of binary counters 16 and 17 are applied next to low-pass filters 18 and 19, having cut-off frequencies at about 600 cycles per second. The waves of lines E and F of FIG. 4 are transformed therefore into smooth sinusoidal form for modulation onto carrier waves.

Master timer 14 supplies quadrature carrier waves to modulators 20 and 21 and pilot tones to combiner 24. A carrier frequency of 1575 cycles is proposed for a practical embodiment of this invention. This frequency is more favorably placed with respect to the delay distortion characteristic of the telephone voice-band than the 2400-cycle carrier proposed for the single sideband system of my previous application. Band-edge pilot tones at 675 and 2475 cycles per second are also to be generated. Therefore, master timer 14 may advantageously comprise a crystal-controlled oscillator at the least common multiple of these frequencies, 51.975 kilocycles per second. Frequency dividers may advantageously be employed to obtain these frequencies as subharmonics of the master frequency. Master timer 14 must also include a 90° phase shifter at the carrier frequency of 1575 cycles.

Modulators 20 and 21 are preferably of the balanced type and modulate the respective outputs of filters 18 and 19 onto respective quadrature carrier waves from master timer 14.

Figure 3A:
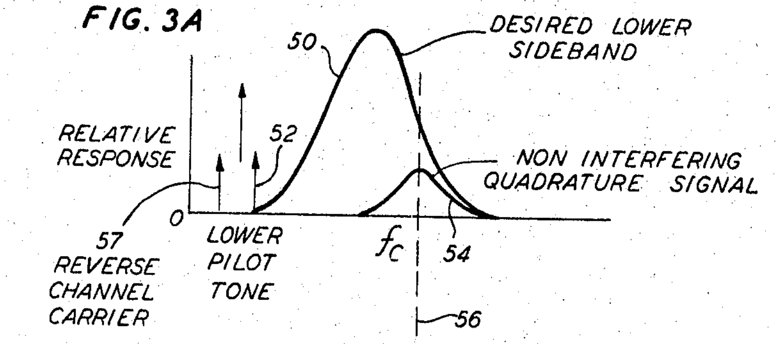
FIGS. 3A and 3B are frequency response diagrams of the respective lower and upper vestigial sideband portions of the composite line signal generated in the transmitting terminal of FIG. 1.
Figure 3B:
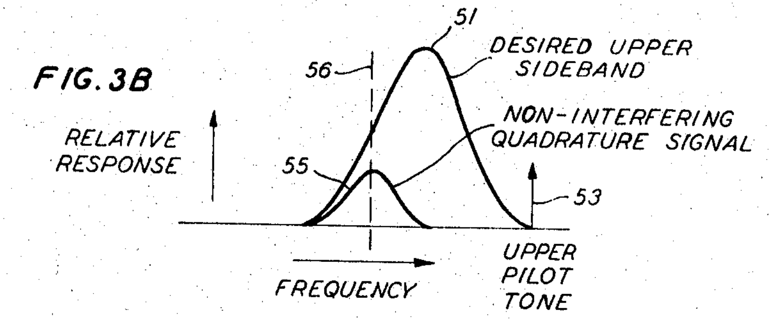

The outputs of modulators 20 and 21 are spectrally shaped in vestigial sideband filters 22 and 23, respectively. Vestigial sideband filter 22 is designed to select the lower sideband from the output of 0° modulator 20 with raised cosine spectral shaping as shown in FIG. 3A in curve 50. A low-level, double-sideband residuum about the carrier frequency also results as indicated by curve 54, but this is in quadrature with the vestigial sideband and is therefore noninterfering. Similarly, the upper sideband is selected from the output of 90° modulator 21 and shapes it in the raised cosine form as shown in FIG. 3B as curve 51. Double-sideband residuum 55 about the carrier frequency position $f_c$ is again in quadrature and therefore, noninterfering. The overall spectrum resembles that of a double sideband signal with upper and lower sidebands in quadrature.

The two vestigial sidebands are combined in combiner 24 with band-edge pilot tones. Combiner 24 is advantageously a simple linear adder. The pilot tones are shown at the band edges in FIGS. 3A and 3B. The lower tone is indicated at position 52 in FIG. 3A and the upper tone at position 53 in FIG. 3B. The frequency space between zero frequency and the lower pilot tone may advantageously be used for a reverse-channel signal as indicated at position 57 in FIG. 3A. Apparatus for reverse-channel signaling is not shown in FIG. 1 because it forms no part of this invention. A convenient frequency for such a reverse channel signal has been proposed at 387 cycles per second. Frequency modulation of this tone at plus and minus 50 cycles per second can be used for signaling at rates up to 150 bits per second without causing interference in the data band between 675 and 2475 cycles per second.

The receiving terminal of FIG. 2 accepts the composite line signal with its pilot tones and reconstructs from it the original serial data signal. The receiving terminal comprises automatic gain-controlled amplifier 30; a demodulating carrier recovery circuit further comprising lower and upper pilot-tone filters 42 and 43, modulator 44, two-times carrier frequency filter 45, binary counter 46 and phase shifter 47; a 0° channel further comprising vestigial sideband filter 32, 0° demodulator 34, low-pass filter 36 and slicer 38; a 90° channel further comprising vestigial sideband filter 33, 90° demodulator 35, low-pass filter 37 and slicer 39; modulo-two adder 40; and data sink 41.

The receiving terminal of FIG. 2 operates first to normalize the line signal level from transmission line 25 in amplifier 30. Amplifier 30 can advantageously include a vario-losser whose attenuation is varied accordingly to the received level of the lower pilot tone on lead 48.

The carrier frequency is recovered in correct phase from the transmitted pilot tones. The output of amplifier 30 is applied to filters 42 and 43. Both are narrow bandpass filters. Filter 42 is tuned to the lower pilot-tone frequency of 675 cycles and filter 43 to the upper pilot-tone frequency of 2475 cycles. A portion of the output of filter 42 is used to control the gain of amplifier 30 over lead 48 as previously mentioned. The outputs of both pilot-tone filters are combined in modulator 44 of conventional design. The additive output of modulator 44 is selected in bandpass filter 45 at 3150 cycles in the example used. This is twice the required carrier frequency. The output of filter 45 is then counted down to the carrier frequency in binary counter 46, which is essentially a complementing flip-flop. Phase-shift adjuster 47 splits the output of counter 46 into quadrature components by standard means. Provision may be made for adjusting circuit 47 to compensate for any undesirable phase shifts introduced in the recovery circuits. The outputs of phase-shift adjuster 47 are the quadrature demodulating carrier waves.

The output of amplifier 30 also drives vestigial sideband filters 32 and 33. These filters have the same characteristics as filters 22 and 23 in FIG. 1. Filter 32 selects the lower sideband and filter 33, the upper. These sidebands are demodulated in modulators 34 and 35 with the aid of the carrier waves from phase-shift adjuster 47 in a conventional fashion. After passing through low-pass filters 36 and 37, identical to filters 18 and 19 in FIG. 1, the demodulated signal waves are squared by slicing in slicers 38 and 39. These slicers are threshold circuits having binary outputs of one or the other state depending on the polarity of their inputs. The outputs of slicers 38 and 39 are shown on lines E and F of FIG. 4 and are seen to be identical to the inputs to low-pass filters 18 and 19 in FIG. 1. From these two signal waves the original serial binary train can be reconstructed by modulo-two addition. The output of adder 40 is at one state when both its inputs are of the same polarity and at another state when both its inputs are of opposite polarity. This is the exclusive-OR function, well known in the art. The serial data train shown on line G of FIG. 4 results from this modulo-two addition. Lines A and G of FIG. 4 are seen to be identical. The serial binary data train is delivered to data sink 41 for appropriate utilization. Data sink 41 may be another computer, paper-tape punch or magnetic-drum store.

All frequencies mentioned in the above description are given by way of example and not by way of limitation. It is apparent that independent data trains can be handled in each of the quadrature channels at 1200 bits per second, thereby dispensing with encoding and decoding apparatus.

Although the present invention has been described in terms of a particular illustrative embodiment, it will be understood that additional embodiments and modifications which utilize its underlying principles will be obvious to those skilled in the art and are included within the scope of the invention.

What is claimed is:

1. A quadrature-carrier, vestigial-sideband data system including a transmitting terminal, a transmission medium and a receiving terminal, said transmitting terminal comprising:

- a serial binary data source,
- means for differentiating signals from said source,
- means forming separate binary trains from respective positive and negative transitions from said differentiating means,
- means modulating said separate binary trains onto respective quadrature phases of a single carrier wave,
- filtering means imparting a vestigial sideband shaping to respetcive upper and lower sidebands of the modulated quadrature phases of the carrier wave from said modulating means,
- means superimposing on the vestigial sideband outputs from said filtering means band-edge pilot tones whose sum is twice the frequency of said carrier wave to form a line signal, and
- means applying said line signal to said transmission medium; and said receiving terminal comprising,

- means recovering carrier frequency components in correct quadrature phases from a summation and halving of said transmitted pilot tones,
- vestigial sideband filters for separating from said line signal respective quadrature sidebands,
- means controlled by said recovered carrier frequency components demodulating respective binary trains from said quadrature sidebands, and
- means reconstructing a serial binary data signal from a modulo-two summation of the respective data trains fro msaid demodulating means.

2. A transmitting terminal for a quadrature-carrier, vestigial sideband data system comprising:

- a digital data source,
- means forming separate binary data trains from signals from said data source according to positive and negative transitions therein,
- a quadrature-carrier wave source,
- means for modulating said separate data trains onto respective quadrautre carrier-wave components from said wave source,
- vestigial sideband filters for respective upper and lower sidebands of the two waves from said modulating means,
- a pilot-frequency source producing tones whose frequencies separately define the upper and lower band edges of the total frequency spectrum occupied by said sidebands and whose sum frequency is twice the frequency of said carrier wave, and
- a linear adder for combining the two selected vestigial sidebands and said pilot tones to form a composite line signal.

3. The transmitting terminal according to claim 2 in which said means for forming separate binary trains comprises:

- means for differentiating signals from said data source to form a train of positive and negative pulses corresponding to positive and negative transitions therein,
- means inverting the pulses from said differentiating means,
- first rectifier means forming directly from said differentiating means a train of pulses of one polarity corresponding to positive transitions in signals from said data source, second rectifier means forming from said inverter means a further train of pulses of said one polarity corresponding to negative transitions in signals from said data source, and binary counter means for each of said trains of pulses forming separate binary trains encoding respective positive and negative transitions in signals from said data source.

4. The transmtting terminal according to claim 2 in which said carrier wave and said pilot tones are derived from a common source.

5. The transmitting terminal according to claim 2 in which said common source comprises a precision oscillator whose frequency is the least common multiple of the frequencies of said carrier wave and said band-edge pilot tones.

6. A receiving terminal for a quadrature-carrier, vestigial sideband data system in which positive and negative transitions in a serial binary data train are separately encoded on quadrature-carrier phases of a single carrier wave and a pair of pilot tones whose frequencies define the band edges of the total transmission band and whose sum is twice the frequency of the single carrier wave are provided comprising an automatic gain-controlled amplifier accepting a composite quadrature-carrier, vestigial sideband signal with band-edge pilot tones, means extracting said pilot tones from the output of said amplifier, means applying one of said extracted pilot tones to said amplifier as a gain control, means recovering a demodulating carrier wave from a summation and halving of said extracted pilot tones, means splitting said demodulating carrier wave into quadrature phases, vestigial sideband filters separating from the output of said amplifier the respective modulated quadrature carrier-wave phases, means controlled by quadrature phases of the demodulating carrier wave in the output of said splitting means for demodulating the outputs of said filters into separate baseband signal trains with poorly defined positive- and negative-going transitions, means slicing said separate baseband signal trains to form squared-up binary trains with sharply defined transitions, means summing modulo-two fashion the binary trains from said slicing means, and a data sink for utilizing the output of said summing means.

7. The receiving terminal according to claim 6 in which said pilot-tone extracting means comprises narrow-band filter means tuned to the respective frequencies of said band-edge pilot tones.

8. The receiving terminal according to claim 6 in which said carrier-wave recovering means comprises means modulating the pilot tones from said extracting means, bandpass filter means connected to said modulating means for selecting the sum frequency of said pilot tones, said sum being equal to twice the frequency of the modulated carrier waves, a binary counter frequency dividing the output of said bandpass filter to the frequency of the modulated carrier waves, and phase-shift means splitting the output of said binary counter into respective quadrature phases of the demodulating carrier wave.

References Cited

UNITED STATES PATENTS

| | | | |
|---|---|---|---|
| 3,134,855 | 5/1964 | Chasek ------------ | 325—49 X |
| 3,311,442 | 3/1967 | Jager et al. --------- | 325—60 X |

OTHER REFERENCES

Tucker: "A Two-Phase Telecommunication System," article in Electronic Engineering of May 1948, pp. 150–151.

ROBERT L. GRIFFIN, *Primary Examiner.*

J. A. BRODSKY, *Assistant Examiner.*

U.S. Cl. X.R.

179—15; 325—49, 136, 331